United States Patent
Verma et al.

(10) Patent No.: US 9,872,298 B2
(45) Date of Patent: Jan. 16, 2018

(54) SYSTEM AND METHOD FOR REDUCING COLLISIONS IN WIRELESS NETWORKS

(71) Applicant: QUALCOMM Incorporated, San Diego, CA (US)

(72) Inventors: Lochan Verma, San Diego, CA (US); Olufunmilola Omolade Awoniyi-Oteri, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 14/857,556

(22) Filed: Sep. 17, 2015

(65) Prior Publication Data

US 2016/0309480 A1  Oct. 20, 2016

Related U.S. Application Data

(60) Provisional application No. 62/148,704, filed on Apr. 16, 2015.

(51) Int. Cl.
*H04W 72/04* (2009.01)
*H04W 52/26* (2009.01)
(Continued)

(52) U.S. Cl.
CPC ... *H04W 72/0473* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS

| 7,570,929 B1 | 8/2009 | Trompower |
| 7,656,854 B2 | 2/2010 | Benveniste |

(Continued)

FOREIGN PATENT DOCUMENTS

| WO | 2006012211 A2 | 2/2006 |
| WO | 2013062643 | 5/2013 |

OTHER PUBLICATIONS

International Search Report and Written Opinion from International Application No. PCT/US2016/026793, dated Jun. 16, 2016, 14 pp.
(Continued)

*Primary Examiner* — Alex Skripnikov
(74) *Attorney, Agent, or Firm* — Shumaker & Sieffert, P.A.

(57) ABSTRACT

In one example, a system and method includes transmitting a first type of information from a transmitter at a first set of transmission parameters, wherein the first set of transmission parameters includes a first PHY data rate and a first transmission power, transmitting a second type of information at a second set of transmission parameters, wherein the second set of transmission parameters includes a second PHY data rate and a second transmission power, and switching between the first set of transmission parameters and the second set of transmission parameters as a function of the type of information to be transmitted. One or more of the first PHY data rate and the first transmission power are different than the second PHY data rate and the second transmission power, respectively.

21 Claims, 9 Drawing Sheets

| CASE | TRANSMISSION POWER | PHY DATA RATE | PACKET LENGTH |
|---|---|---|---|
| 31 — MORE FRAGMENTS; DURATION FIELD ≠ 0 IN ACK | FIRST FRAG = HIGH POWER; ACK = HIGH POWER | LOWER PHY DATA RATE FOR FIRST FRAG | IF LOWER PHY DATA RATE, LOWER FIRST FRAG LENGTH |
| 32 — ONLY 1 FRAGMENT; DURATION FIELD = 0 IN ACK | DEFAULT POWER | DEFAULT PHY DATA RATE | DEFAULT PACKET LENGTH |
| 33 — TXOP W/ REG DATA – ACK; DURATION FIELD !=0 IN ACK | FIRST DATA PKT = HIGH POWER; ACK = HIGH POWER | LOWER PHY DATA RATE FOR FIRST DATA PKT | IF LOWER PHY DATA RATE, LOWER FIRST DATA PKT LENGTH |
| 34 — TXOP W/ EXPLICIT BLOCK ACK; OR DURATION FIELD !=0 IN BLOCK ACK | FIRST DATA PKT = HIGH POWER; BA REQ = HIGH POWER; ACK = HIGH POWER | LOWER PHY DATA RATE FOR FIRST DATA PKT, FOR BA REQ AND FOR BA | IF LOWER PHY DATA RATE, LOWER FIRST DATA PKT LENGTH |
| 35 — TXOP W/ IMPLICIT BLOCK ACK; OR DURATION FIELD !=0 IN BLOCK ACK | FIRST DATA PKT = HIGH POWER; BLOCK ACK = HIGH POWER | LOWER PHY DATA RATE FOR FIRST DATA PKT AND FOR BLOCK ACK | IF LOWER PHY DATA RATE, LOWER FIRST DATA PKT LENGTH |
| 36 — A-MPDU W/ IMPLICIT BLOCK ACK | FIRST A-MPDU SUBFRAME = HIGH POWER; BLOCK ACK = HIGH POWER | LOWER PHY DATA RATE FOR FIRST A-MPDU SF AND FOR BLOCK ACK | IF LOWER PHY DATA RATE FOR FIRST A-MPDU SF, LOWER FIRST SF LENGTH |

(51) Int. Cl.
  *H04W 74/08* (2009.01)
  *H04W 52/02* (2009.01)
  *H04W 52/14* (2009.01)
  *H04W 52/48* (2009.01)
  *H04W 84/12* (2009.01)

(52) U.S. Cl.
  CPC ..... *H04W 52/267* (2013.01); *H04W 72/0446* (2013.01); *H04W 74/0816* (2013.01); *H04W 52/146* (2013.01); *H04W 52/48* (2013.01); *H04W 84/12* (2013.01); *Y02B 60/50* (2013.01)

(56) References Cited

U.S. PATENT DOCUMENTS

| | | | |
|---|---|---|---|
| 2004/0038695 A1* | 2/2004 | Sharony | H04W 72/046 455/517 |
| 2005/0286440 A1 | 12/2005 | Strutt et al. | |
| 2008/0076466 A1 | 3/2008 | Larsson | |
| 2011/0059762 A1 | 3/2011 | Jones, IV et al. | |

OTHER PUBLICATIONS

Qiao D., et al., "MiSer: An Optimal Low-Energy Transmission Strategy for IEEE 802.11a/h," In Proc. of the ACM/IEEE Intl. Conference on Mobile Computing and Networking, 2003, pp. 161-175.

"Ensuring 802.11n and 802.a/b/g Compatibility," FLUKE networks, retrieved on Jan. 27, 2015, from www.flukenetworks.com, 10 pp.

"IEEE Std 802.11-2012, Part 11: Wireless LAN Medium Access Control (MAC) and Physical Layer (PHY) Specifications," IEEE Standards Association, Mar. 29, 2012, 2793 pp.

Response to Written Opinion dated Feb. 13, 2017 from corresponding PCT Application Serial No. PCT/US2016/026793 (14 pages).

International Preliminary Report on Patentability dated Mar. 27, 2017 from corresponding PCT Application Serial No. PCT/US2016/026793 (9 pages).

\* cited by examiner

| CASE | TRANSMISSION POWER | PHY DATA RATE | PACKET LENGTH |
|---|---|---|---|
| 31 — MORE FRAGMENTS; DURATION FIELD ≠ 0 IN ACK | FIRST FRAG = HIGH POWER; ACK = HIGH POWER | LOWER PHY DATA RATE FOR FIRST FRAG | IF LOWER PHY DATA RATE, LOWER FIRST FRAG LENGTH |
| 32 — ONLY 1 FRAGMENT; DURATION FIELD = 0 IN ACK | DEFAULT POWER | DEFAULT PHY DATA RATE | DEFAULT PACKET LENGTH |
| 33 — TXOP W/ REG DATA – ACK; DURATION FIELD !=0 IN ACK | FIRST DATA PKT = HIGH POWER; ACK = HIGH POWER | LOWER PHY DATA RATE FOR FIRST DATA PKT | IF LOWER PHY DATA RATE, LOWER FIRST DATA PKT LENGTH |
| 34 — TXOP W/ EXPLICIT BLOCK ACK; DURATION FIELD !=0 IN BLOCK ACK | FIRST DATA PKT = HIGH POWER; BA REQ = HIGH POWER; ACK = HIGH POWER | LOWER PHY DATA RATE FOR FIRST DATA PKT, FOR BA REQ AND FOR BA | IF LOWER PHY DATA RATE, LOWER FIRST DATA PKT LENGTH |
| 35 — TXOP W/ IMPLICIT BLOCK ACK; DURATION FIELD !=0 IN BLOCK ACK | FIRST DATA PKT = HIGH POWER; BLOCK ACK = HIGH POWER | LOWER PHY DATA RATE FOR FIRST DATA PKT AND FOR BLOCK ACK | IF LOWER PHY DATA RATE, LOWER FIRST DATA PKT LENGTH |
| 36 — A-MPDU W/ IMPLICIT BLOCK ACK | FIRST A-MPDU SUBFRAME = HIGH POWER; BLOCK ACK = HIGH POWER | LOWER PHY DATA RATE FOR FIRST A-MPDU SF AND FOR BLOCK ACK | IF LOWER PHY DATA RATE FOR FIRST A-MPDU SF, LOWER FIRST SF LENGTH |

FIG. 4

SYSTEM AND METHOD FOR REDUCING COLLISIONS IN WIRELESS NETWORKS

This application claims the benefit of U.S. Provisional Application No. 62/148,704, filed Apr. 16, 2015, which is hereby incorporated by reference in its entirety.

TECHNICAL FIELD

This disclosure relates to techniques for reducing collisions in wireless networks.

BACKGROUND

Wi-Fi is a wireless radio technology that allows electronic devices to exchange data. As defined by the IEEE 802.11 specification, Wi-Fi is a polite protocol that operates on the principle of "listen before talk." A station (STA) implementing one of the 802.11 standards uses a Carrier Sense Multiple Access with Collision Avoidance (CSMA/CA) mechanism to sense other transmissions and backs off from transmitting until the channel is sensed as "idle." According to the rules of CSMA/CA and the 802.11 Distributed Coordination Function (DCF), a STA that wishes to transmit must first listen on the channel for a period of time defined by the DCF Interframe Space (DIFS). If the channel is sensed as "idle" for the duration of the DIFS time period, the STA assumes that no other station is transmitting and that it can begin transmission. If, however, the channel is sensed as "busy", the STA must back off and wait for a random back-off interval before trying to transmit again. In addition, after each transmission, the STA must wait for a random back off period before transmitting again.

A problem with detecting that another station is transmitting is that Wi-Fi stations are not able to transmit and receive at the same time. This makes it difficult for a STA to determine that a collision is occurring or has occurred. To compensate, 802.11 STAs rely on acknowledgement (ACK) frames to indicate that a transmission sent by the STA occurred without error. If the STA has not received an ACK frame within a given timeout period, it knows the transmission has failed for some reason and that the failure may have been due to a collision. The STA therefore, on timing out while waiting for an ACK, backs off for a random back-off interval before trying the transmission again.

Another problem with detecting that another station is transmitting is that a Wi-Fi station may not be in radio range of the station causing the collision. For instance, a station (STA) A may be ready to transmit to an access point (AP) at the same time that STA B is transmitting to the same AP. When STA A can hear the AP but cannot hear STA B. STA B is considered a "hidden node." The Request to Send/Clear to Send (RTS/CTS) frame exchange addresses the "hidden node" problem by having STA B transmit an RTS frame and wait for the AP to transmit a CTS frame in response. Even if STA A cannot hear the RTS from STA B, it should be able to hear the CTS frame sent in response by the AP. Each CTS frame includes a time value used by the other stations to hold off transmission while STA B transmits. This approach is, however, seldom used since it increases the overhead of data transmission.

SUMMARY

In some examples, this disclosure describes techniques for reducing collisions in wireless networks.

In one example, a method includes transmitting a first type of information from a transmitter at a first set of transmission parameters, wherein the first set of transmission parameters includes a first PHY data rate and a first transmission power, transmitting a second type of information at a second set of transmission parameters, wherein the second set of transmission parameters includes a second PHY data rate and a second transmission power, and switching between the first set of transmission parameters and the second set of transmission parameters as a function of the type of information to be transmitted. One or more of the first PHY data rate and the first transmission power are different than the second PHY data rate and the second transmission power, respectively.

In another example, a wireless station includes a receiver, a transmitter, a memory, and a processor connected to the memory, wherein the processor operates by partitioning data retrieved from the memory into two or more data frames, including a first data frame (the lead portion) and a second data frame (the trailing portion), wherein the first data frame is smaller than the second data frame, transmitting the first data frame from the transmitter at a first PHY data rate and a first transmission power; and transmitting the second data frame from the transmitter at a second PHY data rate and a second transmission power. One or more of the first PHY data rate and the first transmission power are different than the second PHY data rate and the second transmission power, respectively.

In another example, a wireless network includes one or more first wireless stations and a second wireless station. Each first wireless station includes a receiver and a transmitter. The second wireless station includes a receiver, a transmitter, a memory and a processor connected to the memory, the receiver and the transmitter. The processor operates to partition data retrieved from the memory into two or more data frames, including a first and a second data frame, wherein the first data frame is smaller than the second data frame; transmit the first data frame from the transmitter at a first PHY data rate and a first transmission power; and transmit the second data frame from the transmitter at a second PHY data rate and a second transmission power. One or more of the first PHY data rate and the first transmission power are different than the second PHY data rate and the second transmission power, respectively.

In yet another example, a computer-readable storage medium stores instructions that, when executed, cause one or more processors to transmit a first transmission from a transmitter at a first PHY data rate and a first transmission power; and transmit subsequent transmissions from the transmitter at a second PHY data rate and a second transmission power. One or more of the first PHY data rate and the first transmission power are different than the second PHY data rate and the second transmission power, respectively.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a table listing example approaches to reduce overhead in data transmission, in accordance with one or more techniques of the present disclosure.

DETAILED DESCRIPTION

Figure 1:
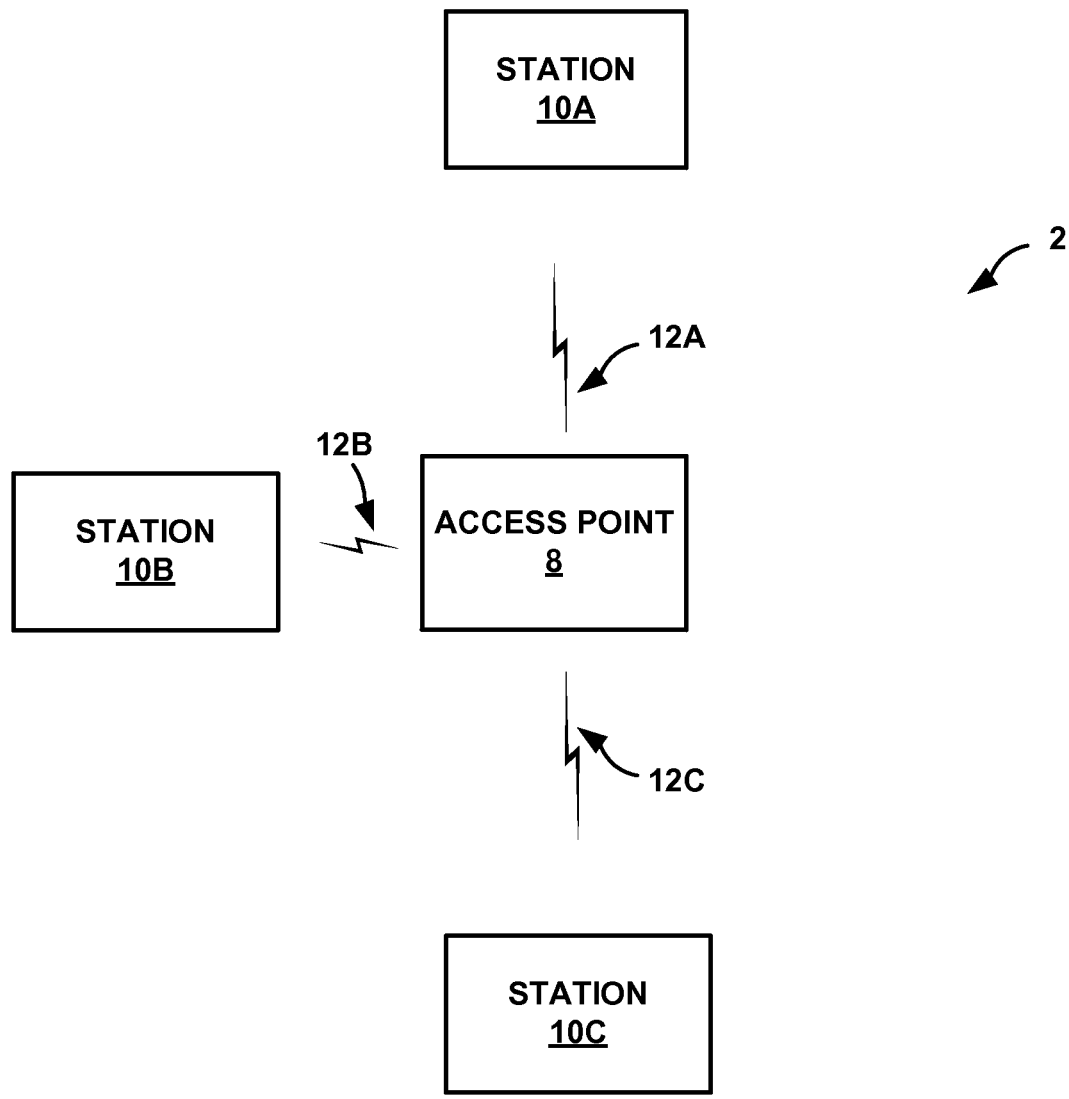
FIG. 1 is a conceptual diagram of an example wireless network, in accordance with one or more techniques of this disclosure.

The hidden node problem is a classic problem in 802.11. As noted above, the RTS/CTS frame exchange is one way suggested in the 802.11 specification to reduce the hidden node problem, but at the high cost of increased overhead of a control frame exchange for each data frame. The 2012 revision of the 802.11 specification is set forth at http://standards.ieee.org/getieee802/download/802.11-2012.pdf. The specification includes clauses defining physical (PHY) layers such as the Direct Sequence Spread Spectrum (DSSS) PHY (defined in the original 802.11 specification), the Orthogonal Frequency Division Multiplexing (OFDM) PHY (defined in the 802.11a amendment), the High Rate Direct Sequence Spread Spectrum (HR/DSSS) PHY (defined in the 802.11b amendment) and the High Throughput (HT) PHY (defined in the 802.11n amendment). Representative 802.11 standards include 802.11-1997, 802.11a, 802.11b, 802.11ab, 802.11c, 802.11d, 802.11e, 802.11f, 802.11g, 802.11h, 802.11j, 802.11n, and 802.11ac. For the sake of the following discussion, devices built to operate within one or more of the 802.11 standards meet or are consistent with one or more of the 802.11 standards.

The problem of hidden nodes is amplified if the stations (STAs) use transmission power other than the maximum transmission power permitted by the 802.11 specification. Features have been added to the 802.11 specification to save power. These features may be used in conjunction with, for example, battery powered portable devices using Wi-Fi wireless radio technology. Such "green transmission" features conserve power by using the transmission power appropriate for a particular rate instead of the maximum transmission power permitted by the 802.11 specification. These green transmission features do, however, contribute to the "hidden nodes" problem since they may further limit the range of STAs A and B.

This disclosure describes a system and method for reducing overhead in wireless networks while at the same time increasing effective range of green technology Wi-Fi stations. In one example approach, signals transmitted from stations in the wireless network are manipulated in terms of transmission power, physical layer (PHY) data rate and/or frame or fragment length to increase the range of each station. One advantage of the approaches discussed in this disclosure, in some examples, is the reduction of the number of hidden nodes in a wireless network and a reduction in the retransmissions needed due to hidden nodes. This improves the throughput and reduces the power consumption of the stations and of the wireless network.

In one example approach, an STA performing power transmission control reduces the PHY data rate of control frames in order to increase range. 802.11a, b, and g have multiple bit rates (e.g., 1 Mbps, 6 Mbps, 54 Mbps, etc.) from which transmitters can choose when sending data. For example, the PHY data rate for a transmitter under 802.11b can be set to 1, 2, 5.5 or 11 Mbps. In 802.11b then, for example, one would choose a data rate such as 1 Mbps or 2 Mbps to extend the range of a control frame, a management frame, or one or more data frames, before returning to 5.5 or 11 Mbps for subsequent data frames.

In one example approach, STA 10A may transmit Control frames at a higher (possibly maximum) transmit power when the Duration Field !=0, or may transmit the control frame at lower (possibly lowest) PHY data rate, or both. The IEEE 802.11 specification has guidance on rate selection for control frames.

In one example approach, STA 10A may transmit Management frames at a higher (possibly maximum) transmit power, or may transmit the control frame at lower (possibly lowest) PHY data rate, or both.

In one example approach, STA 10A may, if a data transmission has a Duration Field !=0 and the data transmission includes duration for transmission of more than one data frame, transmit the first part of the transmission (e.g., the first data frame from the sequence of data frames) at higher (possibly maximum) transmit power, or may transmit the control frame at lower (possibly lowest) PHY data rate), or both. If STA 10A transmits the first part of the data transmission at a lower PHY data, STA 10A may also reduce the length of the first part of the transmission (e.g., the first data frame) to a certain size to reduce impact on throughput.

In some example approaches, the STA increases the transmission power from the normal transmit power level for the control frames at the same time as it decreases the data rate. For example, some 802.11b PC cards offer six selectable transmit power levels, 1, 5, 20, 30, 50 and 100 mW. In one example approach for this PC card, one may set the transmission power at 100 mW to extend the range of a control frame, a management frame, or one or more data frames, before returning to a lower transmit power for subsequent data frames. In some PC cards, the default transmit power is 20 dBm or 100 mW, but one can reduce that power to one of the other five levels. In some example approaches, an adequate, lower power, transmit power is determined on a case-by-case basis by determining the minimum power level that still achieves correct reception of a packet despite intervening path loss and fading.

In an example approach, STA 10A transmits a first type of information from a transmitter at a first set of transmission parameters, transmits a second type of information at a second set of transmission parameters, and switches between the first set of transmission parameters and the second set of transmission parameters as a function of the type of information to be transmitted. The first set of transmission parameters includes a first PHY data rate and a first transmission power while the second set of transmission parameters includes a second PHY data rate and a second transmission power. One or more of the first PHY data rate and the first transmission power are different than the second PHY data rate and the second transmission power, respectively. In one example approach, the first type of information includes either control frames, or management frames, or both. In one such approach, the second type of information includes data to be transmitted.

In another example approach, the first type of information includes control frames, management frames and the lead portion of a data transmission. The second type of information includes the trailing portion of the data to be transmitted. In one such approach, the second type of information is transmitted at green levels of transmission power.

In some example embodiments, a transmit power of 13 dBm (20 mW) is used for normal data traffic, while a transmit power of 17 dBm (50 mW) is used for control frames, management frames, and the first data frame. In some jurisdictions, there is a limit on transmit power. In some such jurisdictions, the transmit power for control frames, management frames, and the first data frame is set to the jurisdiction maximum. Other power levels can be selected as needed.

In one example approach, an STA shortens a first fragment of a data packet while reducing the PHY data rate of the first fragment. In some such approaches, the STA also increases the transmission power for the first fragment before dropping the transmission power down for the following fragments.

In yet another example approach, for data transmissions over a Transmit Opportunity (TXOP) with implicit or explicit Block ACK (acknowledgment), an STA shortens a first data frame while reducing the PHY data rate of the first data frame to the lowest data rate possible (in order to increase range while reducing the impact on overhead). In some such example approaches, the STA increases power as well during transmission of the first data frame. In some such example approaches, in the explicit Block ACK case, the STA reduces the PHY data rate to the lowest data rate possible in order to increase range. In some such example approaches, the STA increases power as well. In one example approach, one or more of a first PHY data rate and a first transmission power associated with a first transmission are different than the second PHY data rate and the second transmission power associated with a second transmission, respectively, in order to increase the range of the first transmission.

In yet another example approach, for aggregated Media Access Control (MAC) Protocol Data Unit (A-MPDU), a STA shortens a first A-MPDU Subframe to a minimum while reducing the PHY data rate of the first A-MPDU Subframe to the lowest data rate possible (in order to increase range while reducing the impact on overhead). In some examples of such approaches, the STA increases power as well during transmission of the first A-MPDU Subframe. In other such example approaches, an STA increases transmission for the explicit Block ACK frame as well.

An example wireless network 2 is shown in FIG. 1. Example wireless network 2 of FIG. 1 is an example of a base service set (BSS), the basic building block of an 802.11 wireless LAN. Each BSS includes a single access point together with all of its associated stations.

In the example wireless network of FIG. 1, a plurality of stations 10 are connected in a BSS to an access point 8 via Wi-Fi connections 12A, 12B, 12C (collectively connections 12). Station 10A is connected to access point 8, for example, via Wi-Fi connection 12A, while Station 10B is connected to access point 8 via Wi-Fi connection 12B and Station 10C is connected to access point 8 via Wi-Fi connection 12C. Wi-Fi connection 12 is implemented via one or more of the 802.11 standards.

Figure 2:
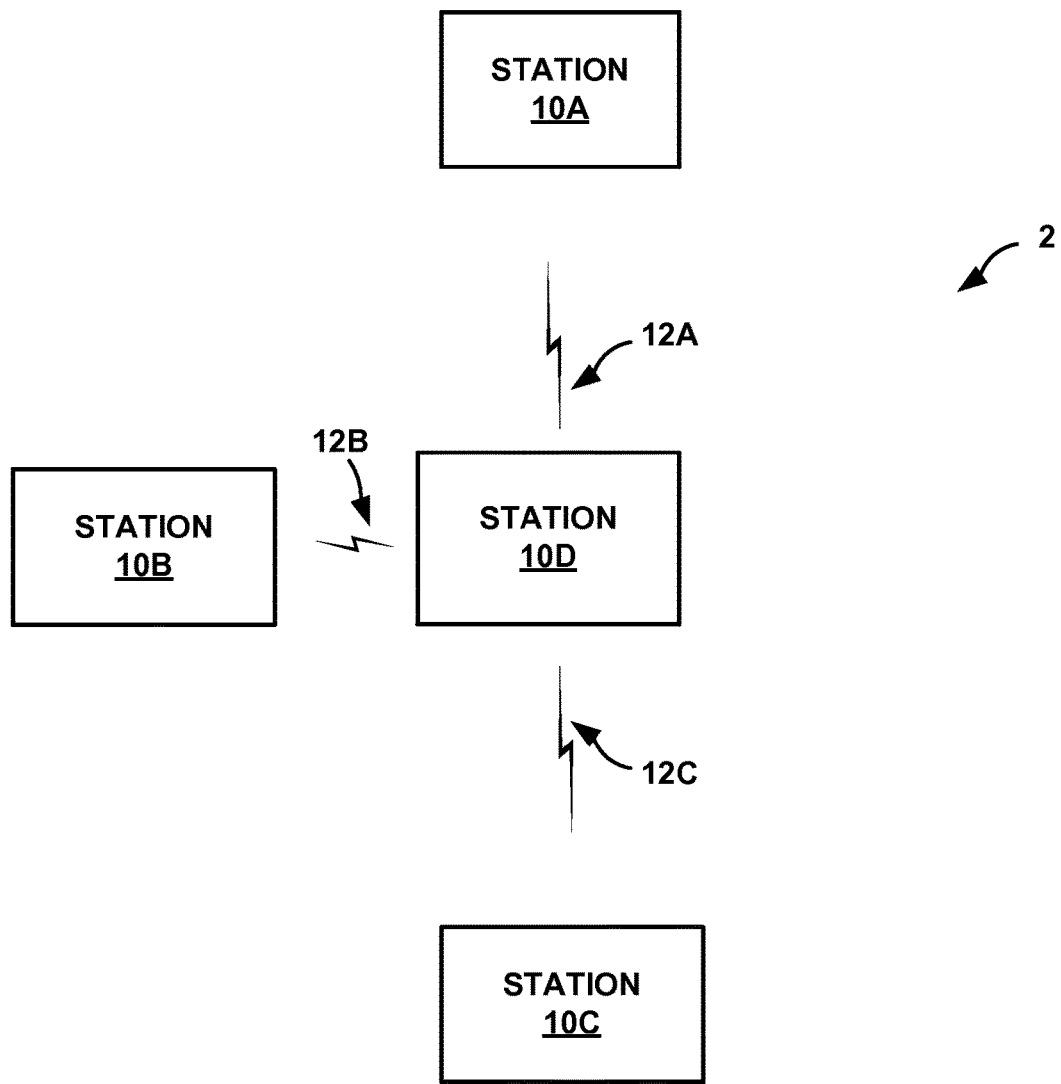
FIG. 2 is another conceptual diagram of an example wireless network, in accordance with one or more techniques of this disclosure.

Another example wireless network 2 is shown in FIG. 2. Example wireless network 2 of FIG. 2 is an example of an independent base service set (IBSS) in that there is no controlling access point 8.

In the example wireless network of FIG. 2, a plurality of stations 10 are connected via Wi-Fi connections 12. Station 10A is connected to Station 10D, for example, via Wi-Fi connection 12A, while Station 10B is connected to Station 10D via Wi-Fi connection 12B and Station 10C is connected to Station 10D via Wi-Fi connection 12C. Wi-Fi connection 12 is implemented via one or more of the 802.11 standards.

As defined by the 802.11 specification, STAs 10A-10D (collectively STAs 10) maintain a Network Allocation Vector (NAV). The NAV, which is set by an STA 10 according to a duration field present in the MAC header of a Wi-Fi frame, specifies the duration of the current transmission. STAs 10 listening on the wireless medium read the duration field from the MAC header and set their NAV to indicate how long the STA must wait before accessing the wireless medium. STAs 10 do not, therefore, have to repeatedly sense the medium to determine if it is busy during the transmission. Instead, STAs 10 can enter a power-saving mode and wait for the NAV to count down to zero before sensing the medium again.

In operation, two STAs 10A and 10C are hidden from each other if they cannot hear each other. This may happen when the RSS (Received Signal Strength) is lower than the receive sensitivity of the respective STA and hence the PHY-CCA.indicate(IDLE) is triggered. If a station's NAV equals zero AND CCA.indicate(IDLE) is triggered, then a STA 10 can transmit.

In one example approach, in order to decode a packet transmitted at PHY rate R correctly, the RSS for STA 10 should be >$RSSI_{min}$ for R, where $RSSI_{min}$≥the receive sensitivity.

Figure 3:
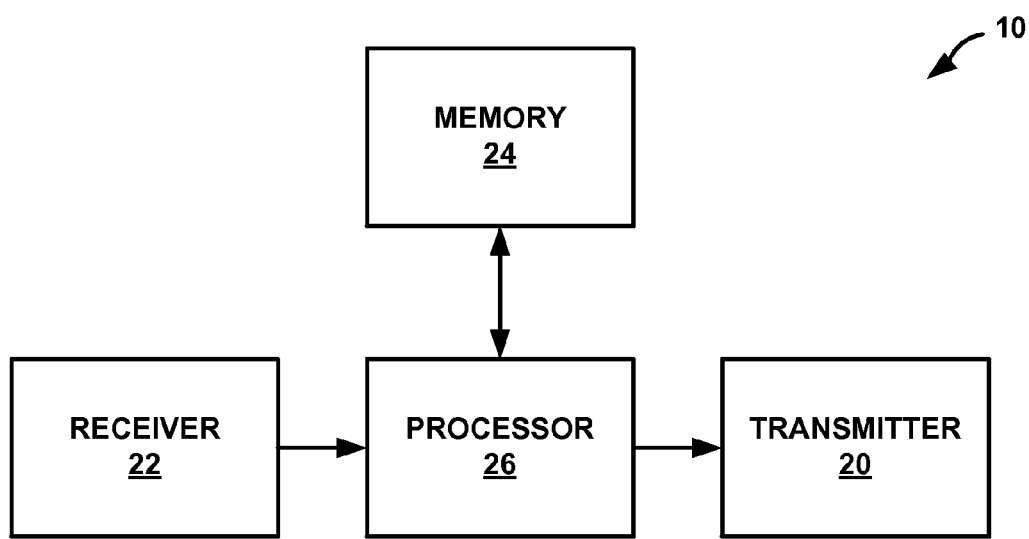
FIG. 3 is a conceptual diagram of an example wireless station, in accordance with one or more techniques of this disclosure.

In one example station 10, as is shown in FIG. 3, station 10 includes a transmitter 20, a receiver 22, a memory 24 and a processor 26 connected to the memory 24. In one example approach, processor 26 operates to partition data retrieved from the memory into two or more data frames, including a first and a second data frame, transmit the first data frame via the transmitter 20 and transmit the second data frame from the transmitter 20 after transmitting the first data frame. In some example approaches, signals transmitted from station 10 via transmitter 20 are manipulated in terms of transmission power, PHY data rate and frame or fragment length to increase the range of each station. In one such example approach, the first data frame is transmitted at a higher transmission power, a lower PHY data rate, or both, when compare to the second data frame.

In example station 10 in FIG. 3, processor 26 may be selected from processors such as digital signal processors (DSPs), general purpose microprocessors, application specific integrated circuits (ASICs), field programmable logic arrays (FPGAs), or other equivalent integrated or discrete logic circuitry.

In one example, STA 10 transmits the first data frame from transmitter 20 at a PHY data rate that is lower than a normal PHY data rate. For example, the normal PHY rate in a 802.11b system may be 11 Mbps, but the first data frame might be transmitted at 1 Mbps or 2 Mbps. Subsequent data frames, e.g., transmitted after the first data frame, are transmitted at the normal PHY data rate by transmitter 20 of STA 10. In some such examples, the first data frame is also transmitted by transmitter 20 of STA 10 at a higher transmission power than the other data frames and, in some such examples, the size of the first data frame is made smaller to reduce the overhead of transmission at the slower PHY data rate. Maximum transmit power and minimum data frame size is defined in the 802.11 specification for a variety of approaches, the descriptions of which are incorporated herein by reference.

In one example approach, processor 26 operates to partition data retrieved from the memory into two or more data frames, including a first and a second data frame, wherein the first data frame is smaller than the second data frame, to transmit the first data frame via the transmitter, wherein transmitting includes selecting one or more of a PHY data rate and a transmission power for the first data frame and to transmit the second data frame from the transmitter after transmitting the first data frame, wherein transmitting the second data frame includes selecting one or more of a PHY data rate and a transmission power for the second data frame.

In one example approach, STAs 10 in wireless network 2 transmit at a reduced transmission power relative to a typical transmit power for the particular channel in order to conserve power. If, however. STA's detect a hidden node problem, e.g., via a collision with an unknown node transmitting to the same destination node, they respond by increasing the transmission power of subsequent frames or by reducing the PHY data rate of subsequent frames to attempt to reach the hidden nodes. If an STA successfully communicates with the hidden node via its enhanced transmission, the node is no longer hidden. This approach eliminates the requirement for the use of RTS/CTS in handling hidden nodes.

Control frames facilitate the exchange of data frames between stations. Some common 802.11 control frames include:

Acknowledgement (ACK) frame: After receiving a data frame, the receiving station (STA) will send an ACK frame to the sending station if no errors are found. If the sending station doesn't receive an ACK frame within a predetermined period of time, the sending station will resend the frame.

Request to Send (RTS) frame: The RTS and CTS frames provide an optional collision reduction scheme for access points with hidden stations. A station sends a RTS frame as the first step in a two-way handshake required before sending data frames.

Clear to Send (CTS) frame: A station responds to an RTS frame with a CTS frame. It provides clearance for the requesting station to send a data frame. The CTS provides collision control management by including a time value for which all other stations are to hold off transmission while the requesting station transmits.

As noted above, the RTS/CTS mechanism has been used in the past to overcome the hidden node problem. This disclosure avoids the use of RTS/CTS in most cases by selectively increasing the range of each station 10. In some example approaches, range is increased by increasing the transmission powers of specific transmissions. In other example approaches, range is increased by slowing the PHY rate of the transmitted signal. And, in some such reduced PHY rate approaches, the amount of data transferred in the specified transmissions is reduced (i.e., reduced segment length) to reduce the overhead of the reduction in PHY rate for those transmissions.

Figure 6:
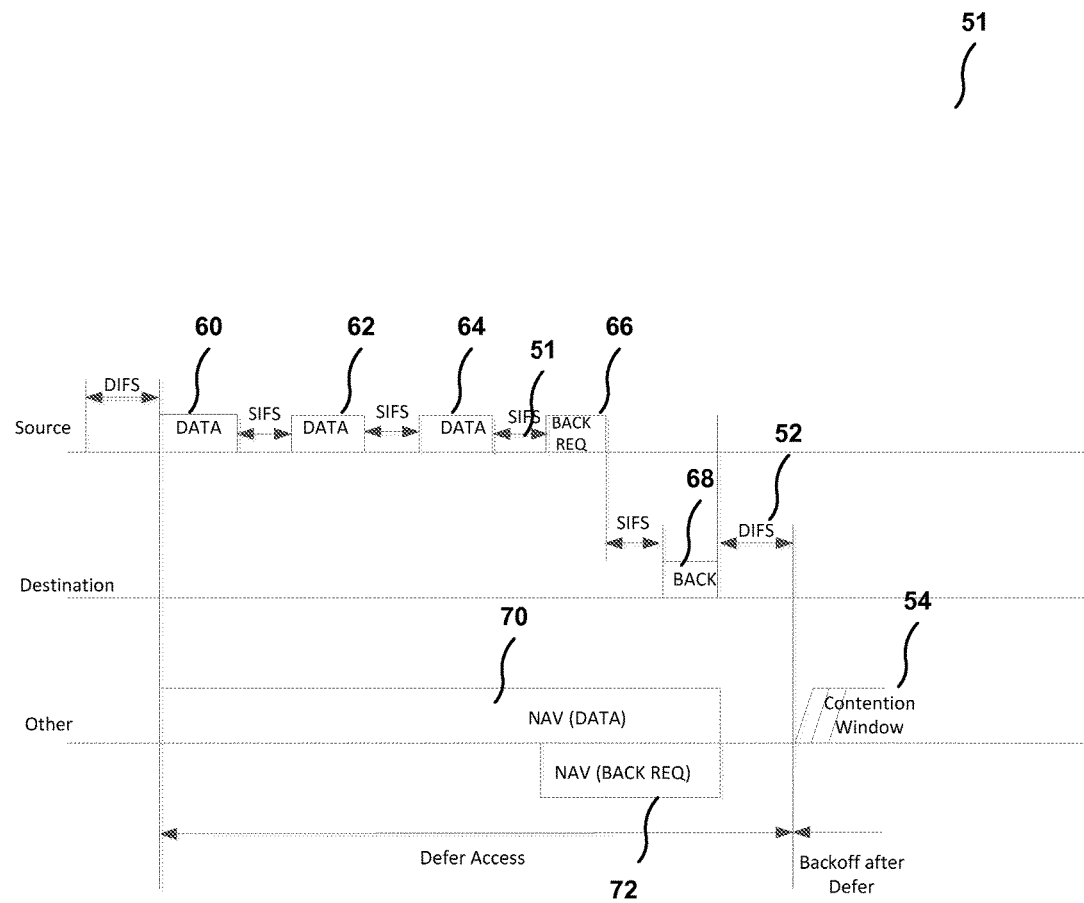
FIG. 6 is another example data transmission, in accordance with one or more techniques of the present disclosure.
Figure 7:
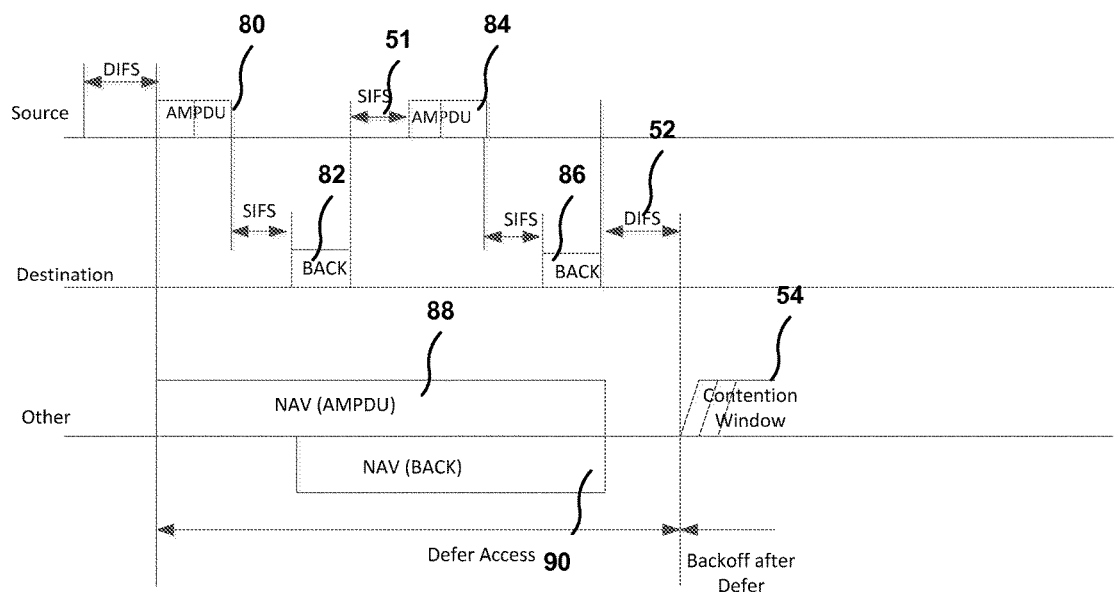
FIG. 7 is another example data transmission, in accordance with one or more techniques of the present disclosure.

As noted above, one can reduce overhead by transmitting the first segment of a transmission at an increased transmission power, by reducing the PHY rate of the first segment of a transmission, or by both increasing the transmission power and decreasing the PHY rate of that first segment of a transmission. One can reduce the overhead of the lower PHY rate by minimizing the length of the first segment of a transmission. Example approaches to reduce overhead in data transmission are shown in FIG. 4 and are illustrated in the diagrams of FIGS. 5-7.

Figure 5:
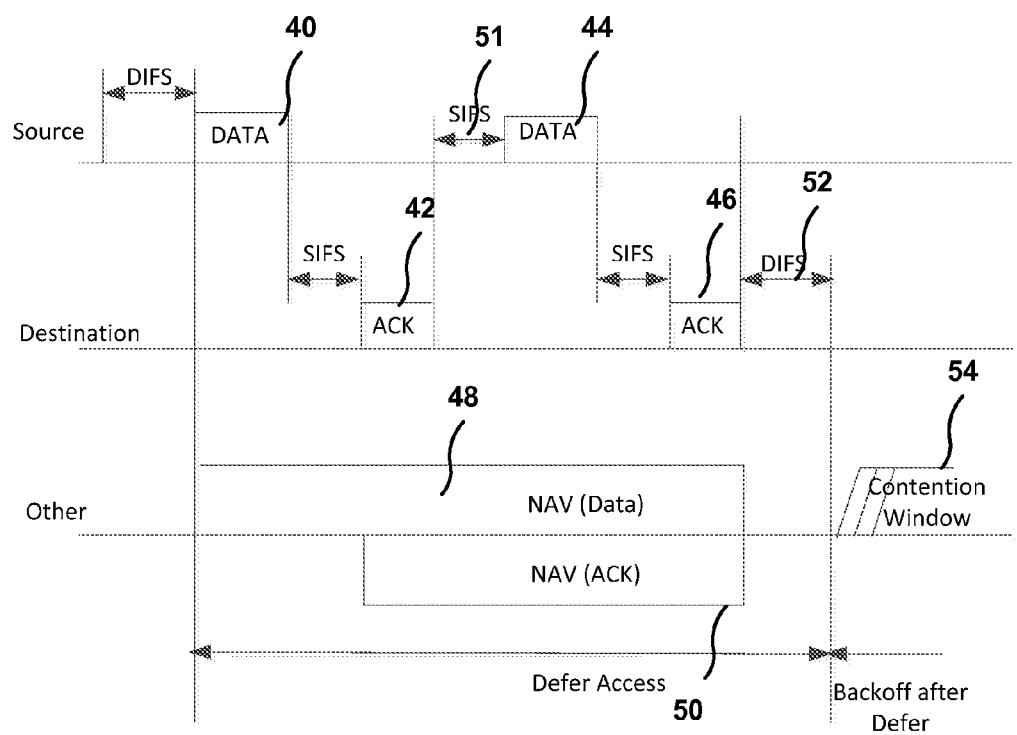
FIG. 5 is an example data transmission, in accordance with one or more techniques of the present disclosure.

An example of a data transmission is shown in FIG. 5. In the example of FIG. 5, a source station (such as STA A in FIG. 1) transmits a first fragment of data 40 at an increased transmission power or at a reduced PHY data rate, or both, in an attempt to reach any hidden nodes. In some example approaches, the increased transmission power may be a predefined value, it may be calculated based on the location of the hidden node, if known, or it may simply be the highest transmission power available. In one example approach, as shown in case 31 in FIG. 4, STA A uses both the highest transmission power and a lower PHY data rate to extend the range of STA A, but only when the data transmission is two or more fragments in length. At the same time, when STA A lowers the PHY data rate, it also reduces the length of the first fragment, if possible.

In one example approach, access point 8 maps each of the stations in its BSS and transmits to each station 10 the path-loss to each of the other stations 10 in the BSS. In one such example approach, each station 10 calculates the transmission power need to reach the other stations 10 in the BSS. In another example approach, the calculation is performed by access point 8 and distributed to each station 10. In some example approaches, STA A only takes the step of trying to reach hidden nodes if specifically configured to do so, or if STA A becomes aware that there might be a hidden node. This might happen, for example, when STA A can hear a response from an STA but not the original message from STA B that led to the response. If AP but cannot hear STA B, STA B is considered a "hidden node."

In the example shown in FIG. 5, the transmission of the first fragment of data 40 is followed by receipt of an ACK 42 from the destination station 10. In one example approach, the ACK is sent by destination station 10 with an increased range (by, for example, increasing transmit power, decreasing the PHY data rate, or both) if the destination station knows that the source station is transmitting more than one fragment. In some such examples, the destination station may be configured such that transmission of the ACK by the destination station at higher transmission power or reduced PHY data rate, or both, only happens if the destination station is aware or suspects that there may be stations that are hidden from the source station.

In one approach, such as shown in case 31 of FIG. 4, both the first data fragment 40 and ACK 42 are transmitted at the highest transmission power level and at a lower PHY data rate. Subsequent data transmissions 44 and ACKs 46 are transmitted with the typical parameters for transmit power and PHY data rate for the situation.

In the example approach shown in FIG. 4, at case 31, when a lower PHY data rate is used for the first data fragment, a shortened packet length is used as well in order to reduce the impact on throughput of the slower data rate. Using the highest transmission power ensures the signal is transmitted loudest; lower PHY data rate ensures the signal goes farther: shorter packet length ensures that impact on throughput is minimized.

Other stations in wireless network 2 receive the NAV 48 with the data received from source station 10, the NAV 50 transmitted with the ACK from the destination, or both NAV 48 and NAV 50 and avoid transmitting as shown in FIG. 5. In this example, subsequent transmissions of data by the source station and of ACKs by the destination station occur at the typical transmission parameters.

In the example shown in FIG. 5, DCF Interframe Space (DIFS) 52 includes a duration that establishes a back-off time for each STA. In some example approaches, STAs defer their transmission for the DIFS duration. Contention window 54 shows a period of time two or more STAs may collide during transmission. SIFS 51 and DIFS 52 are as defined above. SIFS 51 is the amount of time in micro seconds required for a wireless interface to process a received frame and to respond with a response frame.

In one example approach, source station 10 uses the highest permissible transmission power possible for first data fragment 40, while destination station 10 uses the highest permissible transmission power possible for ACK 42. In some such example approaches, a lower PHY data rate is used for each as well. If so, the data frame length of data fragment 40 is reduced as well.

It is not always necessary to move directly to the highest permitted power level, or the slowest permissible data rate. In some example approaches, a transmit power is selected that is higher than the power level used for data transmission but lower than the highest power level permitted by the device, by specification or by regulation. In some such approaches, transmit power is ratcheted up as needed until a suspected hidden node is found. Similarly, one could move to a data rate between the data rate used for data transmission and the lowest data rate available to the device, by specification or by regulation, or ratchet down as needed.

In one example approach, each station (STA) transmitter is capable of transmitting at a plurality of transmission powers consistent with an 802.11 standard. In one such example approach, the first transmission power is the highest transmission power of the plurality of transmission powers.

In one example approach, each station (STA) transmitter is capable of transmitting at a plurality of PHY data rates consistent with an 802.11 standard. In one such example approach, the first PHY data rate is the slowest PHY data rate of the plurality of available PHY data rates.

The result is that the initial transmissions of source station 10 and destination station 10 are either loud (i.e., high in transmit power) or long (i.e., slower data rate), or both, and, in some cases have a reduced segment length to reduce the overhead of the reduced PHY data rate.

As shown in case 32 in FIG. 4, STA A only transmits at an increased transmission power, lower PHY data rate, or both, if the number of fragments transmitted by STA A is greater than one. Otherwise, the typical power and PHY data rate for that 802.11 approach are used.

Also, as shown in case 32 in FIG. 4, in some example approaches, STA A only transmits ACK at an increased transmission power, lower PHY data rate, or both, if the duration field is greater than zero. Otherwise, the default power and PHY data rate are used by STA A to transmit the ACK. In one example, for ACK frames sent by non-Quality-of-Service (non-QoS) STAs, if the More Fragment Bit was equal to 0 in the Frame Control Field of the immediately previous individually addressed data or management frame, the duration value is set to 0. In other ACK frames sent by non-QoS STAs, the duration value is the value obtained from the Duration/ID field of the immediately previous data, management, PS-Poll, BlockAckReq, or BlockAck frame minus the time in microseconds, required to transmit the ACK frame and its Short Inter-Frame Space (SIFS) interval. If the calculated duration includes a fractional microsecond, then value is rounded up to the next higher integer. In one example approach, SIFS is the amount of time in microseconds required for a wireless interface to process a received frame and to respond with a response frame.

In one example approach, a source station examines a Frame Control Field having a parameter used to indicate that data to be transmitted includes a plurality of fragments. If, on examining the Frame Control Field, the parameter indicates the data to be transferred includes a plurality of fragments, the source station selects a first fragment from the plurality of fragments and transmits the first fragment using a first set of transmission parameters. The source station then modifies one or more of the transmission parameters in the first set of transmission parameters to form a modified set of transmission parameters and transmits a second fragment of the plurality of fragments using the modified set of transmission parameters.

In one example approach, one of the modified transmission parameters is the second PHY data rate, wherein the second PHY data rate is higher than the first PHY data rate. In one example approach, the segment length of the first fragment is shorter than the segment length of the second fragment. In one example approach, one of the modified transmission parameters is the second transmission power, wherein the second transmission power is lower than the first transmission power.

The example in FIG. 5 also applies to the transmission of data frames during Transmit Opportunity (TXOP) periods. If the STA is transmitting regular data frames, the first data frame in the packet is sent with either increased transmission power or reduce PHY data rate, or both. In the example shown in case 33 of FIG. 4, station 10 transmits the first data frame at both the highest transmission power and at a lower PHY data rate and reduced packet length. Subsequent packets are transmitted by STA 10 at a typical transmission power and PHY data rate.

In one example approach, as shown in case 33 in FIG. 4 and FIG. 5, STA A uses both the highest transmission power and a lower PHY data rate to extend the range of STA A for transmission of one or more data packets. At the same time, in some such example approaches, when STA A lowers the PHY data rate, it also reduces the length of the first data packet, if possible. In one such example approach, the first data packet is set to the minimum length defined by the specification for the particular application and is transmitted at the lowest data rate permitted by the device, by specification or by regulation. Subsequent data packets are transmitted by STA 10 at a typical fragment length, transmission power and PHY data rate.

As shown in case 33 of FIG. 4, in some example approaches, the ACK sent the destination STA in response to the first data frame may also be sent at an increased transmission power when the duration field is greater than zero. In one approach, the first data frame and the ACK are transmitted at the highest transmission power level permitted by the device, by specification or by regulation. In one approach, both the first data frame and the first ACK are transmitted at the lowest possible PHY data rate, with both returning to the typical settings for subsequent transmissions. Also, as shown in case 33 in FIG. 4, STA A only transmits ACK at an increased transmission power, lower PHY data rate, or both, if the duration field is greater than zero. Otherwise, STA A returns to the typical transmit power and PHY data rate.

In some example approaches, STA A reduces the first data frame transmitted to a minimum frame size prior to transmission when a reduced PHY data rate is used. In other example approaches, when transmitting with a reduced PHY data rate, STA A reduces the first data frame to a frame size smaller than a default frame size but larger than a minimum frame size as defined by the device, by specification or by regulation.

In one example approach, source station 10 uses the highest transmission power possible for first data frame 40, while destination station 10 uses the highest transmission power possible for ACK 42. In some such example approaches, a lower PHY data rate is used for each as well. If a lower data rate is used, in some examples, the data frame length of data frames 40 transmitted at the lower data rate are reduced as well.

Another example of a data transmission according to this disclosure is shown in FIG. 6. In the example of FIG. 6, source station 10 is transferring multiple data frames under a block acknowledgment (BLOCK ACK or BACK). As can be seen in FIG. 6, data frames 60, 62 and 64 are transmitted by a source station 10 and received by a destination station 10. A block acknowledgment is used to allow an entire TXOP to be acknowledged in a single frame via BLOCK ACK 68 (following receipt by destination station 10 of a block acknowledgment request (BLOCK ACK REQ 66)).

Once again, source station 10 transmits first data frame 60 at an increased transmission power or at a reduced PHY rate, or both, in an attempt to reach the hidden node. The increased transmission power may be a predefined value, or it may be calculated based on the location of the hidden node, if known, or it may simply be the highest transmission power available. In one example approach, access point 8 maps each of the stations in its BSS and transmits to each station 10 a value representative of the path-loss to the other stations 10 in the BSS. In one such example approach, each station 10 calculates the transmission power need to reach the other stations 10 in the BSS. In another example approach, the calculation is performed by access point 8 and distributed to each station 10.

In the example shown in FIG. 6, the transmission of first data frame 60 is not followed immediately by receipt of an ACK as in the example of FIG. 5 above. Instead, a BLOCK ACK REQ is transmitted at the end of the TXOP and the destination responds, when appropriate, with a BLOCK ACK. In one example approach, BLOCK ACK 68 is sent at a higher transmit power or a reduced PHY data rate, or both, if data 60 was sent with a duration field not equal to zero as shown in case 34 in FIG. 4.

In some examples, transmission of the BLOCK ACK by the destination station at higher transmission power or reduced PHY data rate, or both, only happens if the destination station is aware or suspects that there may be stations that are hidden from the source station. In one approach, however, as shown in case 34 in FIG. 4, both the first data frame 60 and the first BLOCK ACK 68 are transmitted at the highest transmission power level and at a lower data rate, i.e., a data rate that is lower than a normal date rate. In another approach, both the first data frame 60 and the BLOCK ACK 68 are transmitted at one of the highest transmission power or the lowest possible PHY data rate. In one such approach, SIFS 51 and DIFS 52 are as defined above.

Other stations in wireless network 2 receive the NAV 70 with the data received from source station 10, or the NAV 72 transmitted with BLOCK ACK REQ 66, and avoid transmitting as shown in FIG. 6. In some examples, subsequent transmissions of data frames by the source station occur at the normal transmission parameters.

In one example approach, as shown in case 34 in FIG. 4, source station 10 uses the highest transmission power possible for first data frame 60 and BLOCK ACK REQ 66, while destination station 10 uses the highest transmission power possible for BLOCK ACK 68, but only when the duration field in the header is not zero. In some such example approaches, such as shown in case 34 of FIG. 4, a lower PHY data rate is used for both the first data frame, e.g., data frame 60, and the BLOCK ACK, e.g., BACK 68, as well. In this example, the data frame length of data frame 60 may be reduced as well.

The result is that the initial transmissions of source station 10 and destination station 10 are either loud or long, or both, and, in some cases have a reduced segment length to reduce the overhead of the reduced PHY data rate.

An example of A-MPDU with implicit block acknowledgment is shown in FIG. 7. The same example applies to TXOP with implicit block acknowledgment. As can be seen in FIG. 7, A-MPDU subframes 80 and 84 are acknowledged with a BLOCK ACK 82 and 86, respectively. SIFS 51 and DIFS 52 are as defined above.

Source station 10 transmits subframe 80 at an increased transmission power or at a reduced PHY rate, or both, in an attempt to reach the hidden node. The increased transmission power may be a predefined value, or it may be calculated based on the location of the hidden node, if known, or it may simply be the highest transmission power available.

Figure 8:
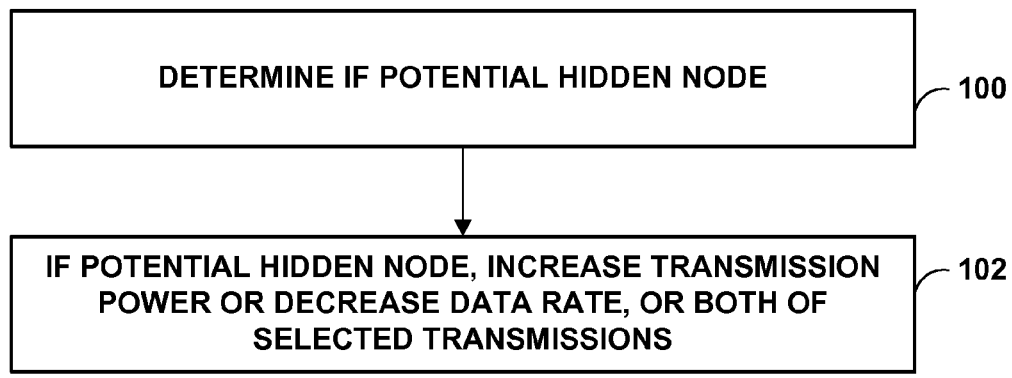
FIG. 8 is a flowchart illustrating a technique for determining whether to adjust transmission parameters for hidden nodes, in accordance with one or more examples of this disclosure.

In the example shown in FIG. 8, the transmission of subframe 80 is followed by transmission by the destination station of a BLOCK ACK 82. In one example approach, BLOCK ACK 82 is sent with an increased range (i.e., higher transmit power, lower data rate, or both) if subframe 80 was sent with duration field not equal to zero.

In some examples, the destination station is configured such that transmission of the BLOCK ACK by the destination station at higher transmission power or reduced PHY data rate, or both, only happens if the destination station is aware or suspects that there may be stations that are hidden from the source station. In one approach, however, both the first subframe 80 and the first BLOCK ACK 82 are transmitted by the source station and destination station, respectively, at the highest transmission power level. In another approach, both the first subframe 80 and the first BLOCK ACK 82 are transmitted by the source station and destination station, respectively, at the lowest possible PHY data rate.

Other stations in wireless network 2 receive the NAV (A-MPDU) 88 with the data received from source station 10, or the NAV (A-MPDU) 90 transmitted with BLOCK ACK 82, and avoid transmitting as shown in FIG. 7. In some examples, subsequent transmissions of subframes by the source station and BLOCK ACKs by the destination station occur at the normal transmission parameters for data transmission.

In one example approach, as shown in case 36 of FIG. 4, source station 10 uses the highest transmission power possible for subframe 80, while destination station 10 uses the highest transmission power possible for BLOCK ACK 82. In some such example approaches, as shown in case 36 of FIG. 4, a lower PHY data rate is used for each as well. If so, the data frame length of subframe 80 is reduced as well.

The same approach can be used for TXOP with implicit BLOCK ACK, as shown in case 35 of FIG. 4. Operation is similar to the A-MPDU case discussed for FIG. 7.

In one example approach, as shown in case 35 of FIG. 4, source station 10 uses the highest transmission power possible for the first data packet, while destination station 10 uses the highest transmission power possible for the corresponding BLOCK ACK, when the duration field is not equal to zero. In some such example approaches, as shown in case 35 of FIG. 4, a lower PHY data rate is used for each as well. If so, the data frame length of the first data frame is reduced as well.

The above discussion shows that the use of the RTS/CTS mechanism for handling hidden nodes can be reduced or avoided by increasing transmission power of selected transmissions or by reducing the rate of data transmission for selected transmissions. In the case of reducing the rate of data transmission, it is shown that the increased overhead of reduced data transmission can be reduced by limiting the length of the data fragments, data frames or A-MPDU subframes being transmitted at the reduced data rate.

A flow chart for determining whether to modify the transmission parameters of selected 802.11 transmissions is shown in FIG. 8. In the example of FIG. 8, a station 10 determines if there are possible hidden nodes (100). This might happen, for example, when a STA A can hear a response from a STA but not the original message from STA B that led to the response. If AP but cannot hear STA B, STA B is considered a "hidden node." If STA B is a hidden node, station 10 increases the transmission power or decreases the PHY data rate, or both, for selected transmissions (102) to STA B.

As noted above, the problem of hidden nodes is amplified if the stations (STAs) use transmission power other than the maximum transmission power permitted by the 802.11 specification. Features have been added to the 802.11 specification to save power. These features may be used in conjunction with, for example, battery powered portable devices using Wi-Fi wireless radio technology. Such "green transmission" features conserve power by using the transmission power appropriate for a particular data rate instead of the maximum transmission power permitted by the 802.11 specification. These green transmission features do, however, contribute to the "hidden nodes" problem since they may further limit the range of STAs A and B.

Figure 9:
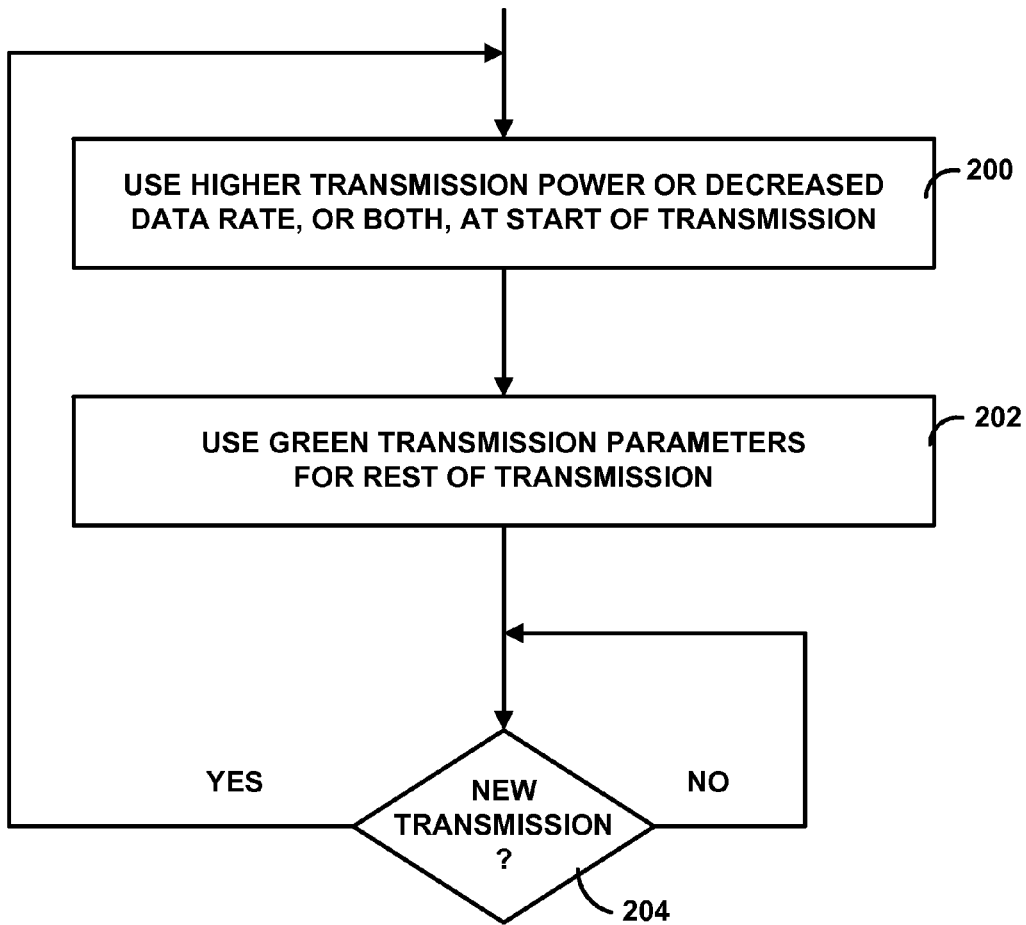
FIG. 9 is a flowchart illustrating a technique for adjusting transmission parameters, in accordance with one or more examples of this disclosure.

One example approach to this problem is to not try to detect hidden nodes. Instead, each station transmits initial segments of a transmission at a higher transmission power, a lower PHY data rate or both, before returning to the transmission parameters needed to meet green transmission standards. One such approach is shown in FIG. 9. FIG. 9 is a flowchart illustrating a technique for adjusting transmission parameters, in accordance with one or more examples of this disclosure. In the example approach of FIG. 9, a higher transmission power, a lower PHY data rate, or both, is used for the first part of a transmission (200). In one such example approach, each acknowledge is also transmitted at a higher transmission power, a lower PHY data rate or both.

In the example shown in case 31 in FIG. 4, STA A uses one or more of a highest transmission power and a lower PHY data rate to extend the range of STA A, but only when the data transmission is two or more fragments in length. At the same time, when STA A lowers the PHY data rate, it also reduces the length of the first fragment, if possible. Subsequent fragments are sent using the green transmission parameters (202). When a new transmission is detected (204), station 10 reverts to the higher transmission power, a lower PHY data rate or both (200).

In the example shown in case 32 in FIG. 4, STA A only transmits at an increased transmission power, lower PHY data rate, or both, if the number of fragments transmitted by STA A is greater than one. Otherwise, the typical, green power and PHY data rate for that 802.11 approach are used.

In the example shown in case 33 of FIG. 4, station 10 transmits the first data frame at an increased transmission power, lower PHY data rate, or both, for the first segment of the transmission. In some such approaches, STA A reduces packet length as well. Subsequent packets within that first transmission are transmitted by STA 10 at a green transmission power and PHY data rate (202) before a check is made to see if a new transmission should be sent (204). In some example approaches, the destination station transmits each ACK at an increased transmission power, lower PHY data rate, or both, as well. Again, a source station may reduce the length of the first packet to reduce overhead due to the lower data rate.

In the example shown in case 34 of FIG. 4, station 10 transmits the first data frame at an increased transmission power, lower PHY data rate, or both, for the first segment of the transmission. In some such approaches, STA A reduces packet length as well. One or more subsequent data frames are transmitted by STA 10 at a green transmission power and PHY data rate (202) before a check is made to see if a new transmission should be sent (204). In some example approaches, the destination station transmits each BLOCK ACK at an increased transmission power, lower PHY data rate, or both, as well. Again, a source station may reduce the length of the first packet to reduce overhead due to the lower data rate.

In one example approach, as shown in case 35 of FIG. 4, source station 10 uses a higher transmission power (e.g., higher than the green transmit power level) for the first data packet, while destination station 10 uses a higher transmission power for the corresponding BLOCK ACK, when the duration field is not equal to zero. In some such example approaches, as shown in case 35 of FIG. 4, a lower PHY data rate is used for each transmission as well. If so, the data frame length of the first data frame may be reduced as well. Subsequent data frames are transmitted at the green transmission parameters.

In one example approach, as shown in case 36 of FIG. 4, source station 10 uses a higher transmission power, lower PHY data rate, or both, for subframe 80, while destination station 10 uses a higher transmission power, lower PHY data rate, or both for BLOCK ACK 82. In some such example approaches, as shown in case 36 of FIG. 4, if a lower PHY data rate is used, the data frame length of subframe 80 may be reduced as well. Subsequent subframes, such as subframe 84 are transmitted at the green transmission parameters.

This disclosure describes a system and method for reducing overhead in wireless networks while at the same time increasing effective range of green technology Wi-Fi stations. In one example approach, signals transmitted from stations in the wireless network are manipulated in terms of transmission power, physical layer (PHY) data rate and/or frame or fragment length to increase the range of each station. One advantage of the approaches discussed in this disclosure, in some examples, is the reduction of the number of hidden nodes in a wireless network and a reduction in the retransmissions needed due to hidden nodes. This may improve the throughput and/or reduce the power consumption of the stations and of the wireless network.

A flow chart for determining whether to modify the transmission parameters of selected 802.11 transmissions is shown in FIG. 8. In the example of FIG. 8, a station 10 determines if there are possible hidden nodes (100). This might happen, for example, when a STA A can hear a response from a STA but not the original message from STA B that led to the response. If AP but cannot hear STA B, STA B is considered a "hidden node." If STA B is a hidden node, station 10 increases the transmission power or decreases the PHY data rate, or both, for selected transmissions (102) to STA B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used for storing desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors 20, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. In a wireless network, a method comprising:
    transmitting a first type of information from a transmitter at a first set of transmission parameters, wherein the first set of transmission parameters includes a first PHY data rate and a first transmission power, wherein transmitting the first type of information includes:
        examining a frame control field having a parameter used to indicate that data to be transmitted includes a plurality of fragments; and
        if the parameter indicates the data to be transmitted includes a plurality of fragments, selecting a first fragment from the plurality of fragments and transmitting the first fragment at the first PHY data rate and the first transmission power;
    transmitting a second type of information from the transmitter at a second set of transmission parameters, wherein the second set of transmission parameters includes a second PHY data rate and a second transmission power, and wherein transmitting the second type of information from the transmitter includes transmitting a second fragment at the second PHY data rate and the second transmission power; and
    switching between the first set of transmission parameters and the second set of transmission parameters as a function of a type of the information to be transmitted,
    wherein the second PHY data rate is higher than the first PHY data rate;
    wherein a segment length of the first fragment is shorter than a segment length of the second fragment, and
    wherein the first transmission power is higher than the second transmission power.

2. The method of claim 1, wherein the first type of information includes one or more of a data frame, a control frame and a management frame.

3. The method of claim 1, wherein the transmitter transmits at a plurality of PHY data rates consistent with an 802.11 standard and wherein the first PHY data rate is a slowest PHY data rate of the plurality of PHY data rates available to the transmitter.

4. The method of claim 1, wherein the transmitter transmits at a plurality of transmission powers consistent with an 802.11 standard and wherein the first transmission power is a highest transmission power of the plurality of transmission powers available to the transmitter.

5. The method of claim 1,
    wherein transmitting the second type of information further includes transmitting a plurality of second fragments at the second PHY data rate and the second transmission power, wherein the segment length of the first fragment is shorter than the segment length of each of the second fragments.

6. The method of claim 5, wherein the first transmission power and the second transmission power are transmission powers consistent with an 802.11 standard.

7. The method of claim 5, wherein the first PHY data rate and the second PHY data rate are PHY data rates consistent with an 802.11 standard.

8. The method of claim 7, wherein selecting a first fragment from the plurality of fragments includes partitioning the data to reduce overhead of transmission of the first fragment.

9. The method of claim 1, wherein the first transmission power and the second transmission power are transmission powers consistent with an 802.11 standard.

10. The method of claim 1, wherein the first PHY data rate and the second PHY data rate are PHY data rates consistent with an 802.11 standard.

11. A wireless station, comprising:
a receiver;
a transmitter;
a memory; and
a processor connected to the memory, the receiver and the transmitter, wherein the processor operates to:
examine a frame control field having a parameter used to indicate that data to be transmitted includes a plurality of fragments;
partition the data retrieved from the memory into a plurality of fragments, including a first fragment and a second fragment;
if the parameter indicates the data to be transmitted includes a plurality of fragments, select the first fragment from the plurality of fragments and transmit the first fragment from the transmitter at a first PHY data rate and a first transmission power; and
transmit the second fragment from the transmitter at a second PHY data rate and a second transmission power,
wherein the second PHY data rate is higher than the first PHY data rate;
wherein a segment length of the first fragment is shorter than a segment length of the second fragment, and
wherein the first transmission power is higher than the second transmission power.

12. The wireless station of claim 11, wherein the first PHY data rate and the second PHY data rate are data rates consistent with an 802.11 standard.

13. The wireless station of claim 11, wherein the first transmission power and the second transmission power are transmission powers consistent with an 802.11 standard.

14. The wireless station of claim 11, wherein the plurality of fragments includes a plurality of second fragments, wherein each of the second fragments has a segment length greater than a segment length of the first fragment.

15. The wireless station of claim 14, wherein the processor further operates to transmit each of the plurality of second fragments at the second PHY data rate and the second transmission power.

16. A wireless network, comprising:
one or more first wireless stations, wherein each first wireless station includes a receiver and a transmitter; and
a second wireless station, wherein the second wireless station includes:
a receiver,
a transmitter;
a memory; and
a processor connected to the memory, the receiver and the transmitter, wherein the processor operates to:
examine a frame control field having a parameter used to indicate that data to be transmitted includes a plurality of fragments;
partition the data retrieved from the memory into a plurality of fragments, including a first fragment and a second fragment;
if the parameter indicates the data to be transmitted includes a plurality of fragments, select the first fragment from the plurality of fragments and transmit the first fragment from the transmitter at a first PHY data rate and a first transmission power; and
transmit the second fragment from the transmitter at a second PHY data rate and a second transmission power,
wherein the second PHY data rate is higher than the first PHY data rate;
wherein a segment length of the first fragment is shorter than a segment length of the second fragment, and
wherein the first transmission power is higher than the second transmission power.

17. The wireless network of claim 16, wherein the first transmission power and the second transmission power are transmission powers consistent with an 802.11 standard.

18. The wireless network of claim 16, wherein the first PHY data rate and the second PHY data rate are PHY data rates consistent with an 802.11 standard.

19. The wireless network of claim 16, wherein the plurality of fragments includes a plurality of second fragments, wherein each of the second fragments has a segment length greater than the segment length of the first fragment.

20. The wireless network of claim 19, wherein the processor further operates to transmit each of the second fragments at the second PHY data rate and the second transmission power.

21. A non-transitory computer-readable storage medium storing instructions that, when executed, cause one or more processors to:
transmit a first type of information from a transmitter at a first set of transmission parameters, wherein the first set of transmission parameters includes a first PHY data rate and a first transmission power, wherein transmitting the first type of information includes:
examining a frame control field having a parameter used to indicate that data to be transmitted includes a plurality of fragments; and
if the parameter indicates the data to be transmitted includes a plurality of fragments, selecting a first fragment from the plurality of fragments and transmitting the first fragment at the first PHY data rate and the first transmission power;
transmit a second type of information from the transmitter at a second set of transmission parameters, wherein the second set of transmission parameters includes a second PHY data rate and a second transmission power, wherein transmitting the second type of information from the transmitter includes transmitting a second fragment at the second PHY data rate and the second transmission power; and
switch between the first set of transmission parameters and the second set of transmission parameters as a function of the type of information to be transmitted,
wherein the second PHY data rate is higher than the first PHY data rate;

wherein a segment length of the first fragment is shorter than a segment length of the second fragment, and wherein the first transmission power is higher than the second transmission power.

* * * * *